March 19, 1940.  A. G. BADE  2,193,794
VARIABLE SPEED TRANSMISSION
Filed May 18, 1936
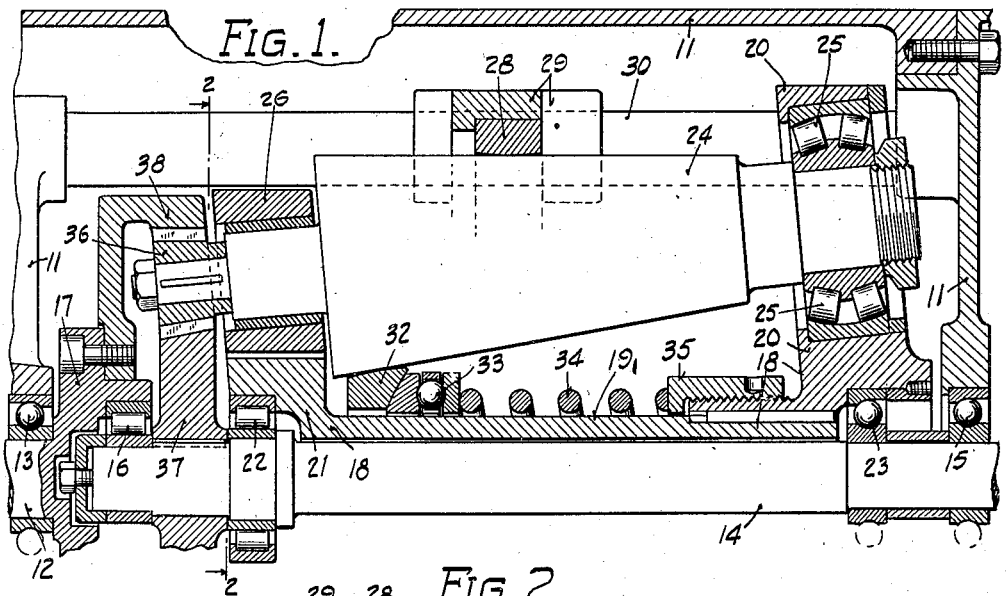
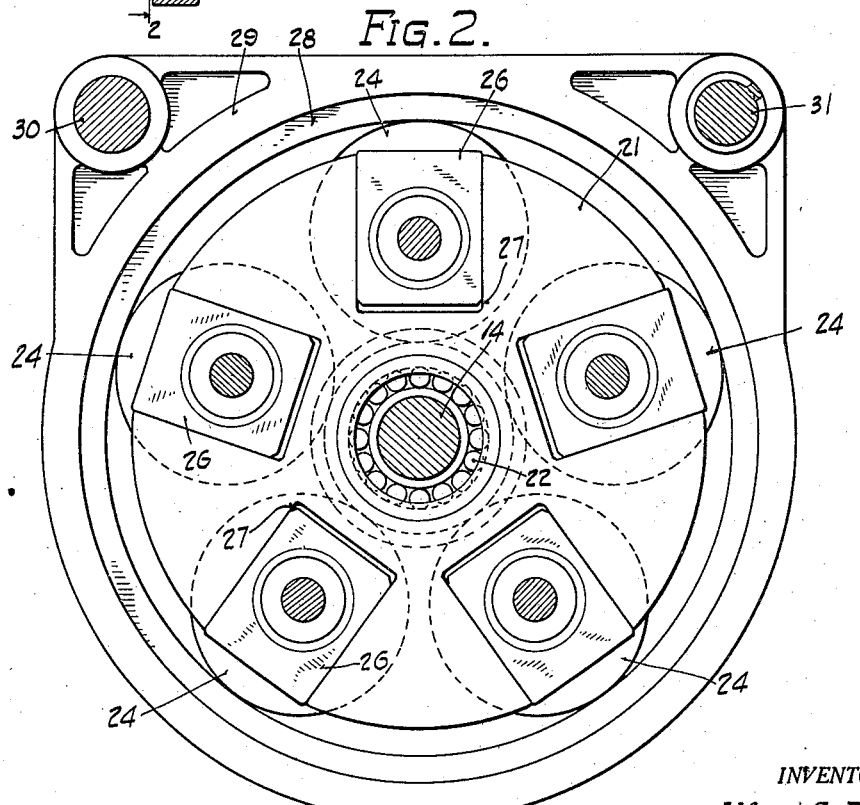
INVENTOR.
Alfred G. Bade
BY
ATTORNEY.

Patented Mar. 19, 1940

2,193,794

UNITED STATES PATENT OFFICE 2,193,794

VARIABLE SPEED TRANSMISSION

Alfred G. Bade, Milwaukee, Wis., assignor to The Falk Corporation, Milwaukee, Wis., a corporation of Wisconsin Application May 18, 1936, Serial No. 80,222

11 Claims. (Cl. 74—281)

This invention relates to variable speed transmissions of the type involving a set of inclined tapered planet rollers and a contact element adjustable along the rollers to regulate their planetary action.

A variable speed transmission of this general type, and which has proven commercially successful, is disclosed in the copending application of myself and Walter P. Schmitter, Serial No. 52,095, filed November 29, 1935. In the transmission therein shown, the contact element is in the form of an encircling ring and the required contact pressures between it and the rollers is maintained by a pressure inducing device which acts through the roller supporting bearings and in such manner as to subject those bearings to peculiar forces which introduce serious bearing problems; and in order to assure adequate contact pressure between each individual roller and ring, the ring is so mounted as to permit it to float radially.

One object of the present invention is to provide, in a transmission of the character described, pressure inducing means which acts directly upon the rollers in a manner to press them against the contact element.

Another object is to provide a unitary pressure-inducing device which in itself will assure adequate pressure contact of each of the several rollers against the contact element and thereby avoid the necessity of floatably mounting the contact element.

Another object is to provide an improved pressure inducing device so combined and arranged with other parts of the transmission as to automatically vary the contact pressures between the rollers and contact element as the output speed of the transmission changes.

Other more specific objects and advantages will appear, expressed or implied, from the following description of an illustrative embodiment of the present invention.

In the accompanying drawing:

Fig. 1 is a longitudinal sectional view of a portion of a variable speed transmission constructed in accordance with the present invention.

Fig. 2 is a transverse sectional view taken substantially along the line 2—2 of Fig. 1.

The variable speed transmission shown in the drawing comprises a driven shaft 12 journalled in a bearing 13 in a frame or housing 11, portions only of which are shown. A drive shaft 14 aligned with the driven shaft 12 is journalled in a bearing 15 at the opposite end of the frame 11, and in a bearing 16 mounted in a head 17, fixed on the end of the driven shaft 12, substantially as shown in the application hereinabove identified.

A rotor, shown at 18 and comprising a hollow tubular shaft 19 and two end discs or spiders 20 and 21, is freely rotatable about the drive shaft 14, and mounted thereon by bearings 22 and 23. Carried by the rotor 18 are the tapered rollers 24, in any number found most convenient. Five rollers are shown in the drawing, but in accordance with one aspect of the invention, three rollers might be employed to best advantage. These rollers 24 are mounted in such position that their outer edges are substantially parallel to the axes of the shafts 12 and 14, and their axes, if prolonged, would meet at a common apex on the axial line of the shafts 12 and 14.

Each of the tapered rollers 24 is mounted at its smaller end in a self-aligning spherical bearing 25 of a well known type, carried by the end spider 20 of the rotor 18. These bearings 25 will permit angular displacement of the rollers 24 about a fixed point at the center of its bearing 25.

At the opposite or larger end of the rollers 24, each roller is journalled in a block 26, carried by the end disc 21 of the rotor 18, and slidable radially of the shaft 14 in a guide slot 27 in the end disc 21 of the rotor 18.

Encircling and contacting the rollers 24 is a frictional control ring 28 against which the rollers 24 are pressed with sufficient force to insure a gripping contact therewith. The ring 28 is mounted in a carrier 29, which in turn is mounted, for movement parallel to the axis of the shaft 14, upon a guide rod 30 and a screw rod 31. Movement of the carrier 29 and ring 28 along substantially the length of the rollers 24 is secured by rotation of the screw rod 31 in the manner described in the application hereinabove identified.

Although pressure of the rollers 24 against the ring 28 sufficient to prevent slippage might conceivably be secured solely by centrifugal force urging the rollers outward against the ring, it is usually desirable to provide pressure-inducing means for that purpose. In the transmission shown, such means includes an inner floating ring 32 encircling but spaced from the tubular portion 19 of the rotor 18. This ring 32 contacts each of the rollers 24 on its inner side near its larger end. A floating thrust-bearing 33, loosely encircling the tubular portion 19, bears against the floating ring 32 and is centered with respect to the ring 32 by a slight inclination of its surface of contact with the ring 32.

A coil spring 34, surrounding the tubular portion 19 and secured in place thereon by a sleeve 35, presses against the bearing 33 and forces the ring 32 axially of the rotor 18. The wedge action of the ring 32 against the inclined inner side of each of the rollers 24, near its outwardly moveable large end, urges the rollers outwardly at that end, against the outer control ring 28. The pressure of the spring 34 against the inner ring 32, and thus the pressure of the rollers 24 against the outer ring 28, can be regulated by adjusting the sleeve 35 which is in screw threaded engagement with the rotor 18.

It is preferable that the end portion 20 be made separable from the rest of the rotor 18, to facilitate assembly and removal of the ring 32, bearing 33, spring 34, and sleeve 35 upon the central tubular portion 19 of the rotor.

Upon one end of each of the rollers 21 is fixed a pinion gear 36. These gears 36 together form a set of planet gears engaging with and revolving abut a sun gear 37 fixed to the drive shaft 14. The planet gears 36 also are engaged with an internally toothed gear 38 affixed to the head 17 of the driven shaft 12. The internal gear 38, the pinions 36, and the sun gear 35 are all preferably formed with excess clearance at the bases of their teeth, to permit slight outward movement of the rollers 24 and their attached pinions 36 without objectionable interference.

In operation, as may be seen from the drawing and the above description, rotation of the drive shaft 14 and the sun gear 37 will cause rotation of the pinion gears 36 and the rollers 24 on their individual axes, and also, because of the grip of the rollers 24 with the stationary outer ring 28, will cause the pinions 36 and rollers 24 to revolve around the shaft 14, with the rotor 18 in which they are mounted. It will of course be understood that this planetary action will vary with the position of the ring 28 on the rollers 24, and the diameter of the rollers at the point of contact with the ring. By reason of the planetary action of the pinion gears 36, as controlled by that of the rollers 24, movement will be transmitted to the internal gear 38 and the driven shaft 12 causing the latter to rotate at a speed dependent upon and variable with the position of the ring 28 along the rollers 24.

The pressure between the rollers 24 and the outer ring 28 necessary to prevent slippage is effected by the force of the spring 34 acting through the inner ring 32 to urge the rollers 24 outward against the outer ring 28, aided by centrifugal force as the rollers revolve around the shaft 14. The floating of the inner ring 32 allows it to adjust itself to minor inequalities of the rollers 24 as confined by the outer ring 28, and thus distributes the pressure of the spring 34 equally to all of the rollers. The blocks 26, fitting in the grooves 27, hold the ends of the axes of the rollers securely against any movement relative to the rotor 18 except radially outward from the center against the ring.

Moreover, each of the rollers 24 will also function as a lever, having the self-aligning bearing 25 as its fulcrum, and transmitting the pressure of the inner ring 32 at one end, to the outer ring 28 between its ends. Thus as the outer ring 28 is moved along the rollers 24 toward the fulcrum bearing 25, the increase in leverage increases the pressure of the rollers 24 against the ring 28, thus obtaining an automatic increase in pressure as the ring is shifted toward the small end of the rollers to decrease the output speed.

Since the torque transmitting capacity of the transmission depends upon the degree of contact pressure between the rollers and outer ring, it follows that the torque transmitting capacity will increase automatically, as the output speed decreases, so that the horse-power capacity of the transmission tends to remain substantially constant at all output speeds.

Various changes may be made in the embodiment of the invention hereinabove specifically described without departing from or sacrificing the invention as defined in the appended claims.

I claim:

1. In a variable speed transmission, the combination of a circular control element, a longitudinally tapered rotary member inclined with respect to the axis of said element and mounted to revolve about said axis in rolling engagement with said element, said rotary member being moveable into pressure contact with said element, said rotary member and said control element being relatively moveable axially of said element to regulate the speed ratio of the transmission, and means including a device moveable with respect to said member in the direction of said axis to press said member against said element.

2. In a variable speed transmission, the combination of a plurality of conical rollers mounted for planetary movement about a central axis, said rollers being inclined with respect to said central axis and being restrained against lengthwise movement but moveable radially of said axis, a control ring in rolling engagement with said rollers and shiftable lengthwise thereof to regulate the speed ratio of the transmission, and means including a member moveable lengthwise of said rollers and against inclined surfaces thereof for pressing the same against said ring.

3. In a variable speed transmission, the combination of a plurality of conical rollers mounted for planetary movement about a central axis, said rollers being inclined with respect to said central axis and being restrained against lengthwise movement but moveable outward from said axis, a control ring encircling and contacting said rollers and shiftable lengthwise thereof to regulate the speed ratio of the transmission, and supporting means for said rollers including a member centrally disposed with respect to said rollers and moveable along said central axis to press said rollers outwardly against said ring.

4. In a variable speed transmission, the combination of a circular control element, a longitudinally tapered rotary member mounted to revolve about the axis of said element in rolling engagement therewith and for movement towards said member into pressure contact therewith, said rotary member being inclined with respect to said axis and having its side opposite the point of engagement with said element inclined with respect to said axis, said rotary member and said control element being relatively moveable axially of said element to regulate the speed ratio of the transmission, and supporting means for said member including means moveable relative to said member axially of said element against said inclined side of said member to urge said member into pressure contact with said element.

5. In a variable speed transmission, the combination of a rotor, a plurality of conical planetary rollers supported for rotation with and with respect to the rotor and for outward movement with respect thereto, said rollers being mounted in an inclined position with their outer sides substantially parallel to the axis of said rotor and with their inner sides at an angle to the axis of said rotor, a ring encircling and contacting said rollers and shiftable longitudinally thereof to regulate the speed ratio of the transmission, and a central circular member in rolling contact with the inclined inner sides of said rollers and moveable axially of said rotor to press said rollers outwardly against said ring.

6. In a variable speed transmission, the combination of a plurality of conical rollers mounted for planetary movement about a central axis, a control ring encircling and contacting said rollers and shiftable lengthwise thereof to regulate the speed ratio of the transmission, means supporting said rollers in an inclined position with one end of each roller radially fixed and the other end radially moveable with respect to said central axis, and a centrally disposed member contacting said rollers and moveable lengthwise thereof, said member coacting with said supporting means to urge said rollers outwardly against said ring.

7. In a variable speed transmission, the combination of a rotor, a plurality of conical planetary rollers fulcrumed at one end in said rotor and rotatable with and with respect to said rotor, a control ring encircling and contacting said rollers and shiftable lengthwise thereof to regulate the speed ratio of the transmission, and a central circular member in rolling engagement with said rollers and shiftable lengthwise thereof to press said rollers outwardly against said ring.

8. In a variable speed transmission, the combination of a circular control element, a longitudinally tapered rotary member inclined with respect to the axis of said element and mounted to revolve about said axis in rolling engagement with said element, said rotary member and said control element being relatively moveable axially of said element to regulate the speed ratio of the transmission, means supporting said member with one end radially fixed with respect to said axis and with the other end moveable with respect thereto, and a means moveable lengthwise of said member against an inclined surface thereof to urge said member into pressure contact with said element.

9. In a variable speed transmission, the combination of a plurality of conical rollers mounted for planetary movement about a central axis and for outward movement with respect thereto, supporting means therefor, a control ring encircling and contacting said rollers and shiftable lengthwise thereof to regulate the speed ratio of the transmission, and means including a central ring in rolling engagement with said rollers and coacting with said supporting means to urge said rollers into pressure contact with said encircling ring, said central ring being radially moveable to substantially equalize the contact pressures.

10. In a variable speed transmission, the combination of a plurality of conical rollers mounted for planetary movement about a central axis and for outward movement with respect thereto, supporting means therefor, a control ring encircling and contacting said rollers and shiftable lengthwise thereof to regulate the speed ratio of the transmission, a central member in rolling engagement with said rollers, and resilient means urging said member lengthwise of said rollers, said member coacting with said supporting means to press said rollers against said encircling ring.

11. In a variable speed transmission, the combination of an outer circular element, an inner circular element substantially coaxial therewith, a plurality of relatively inclined conical planet rollers confined between said elements and in rolling engagement with both of said elements, means coacting with said elements to position said rollers, means for effecting relative movement between one of said elements and said rollers lengthwise of the latter to regulate the speed ratio of the transmission, and means for effecting relative movement between the other of said elements and said rollers lengthwise of the latter to effect pressure contact between said rollers and elements, one of said elements being radially yieldable to substantially equalize said contact pressures.

ALFRED G. BADE.